Figure 1:
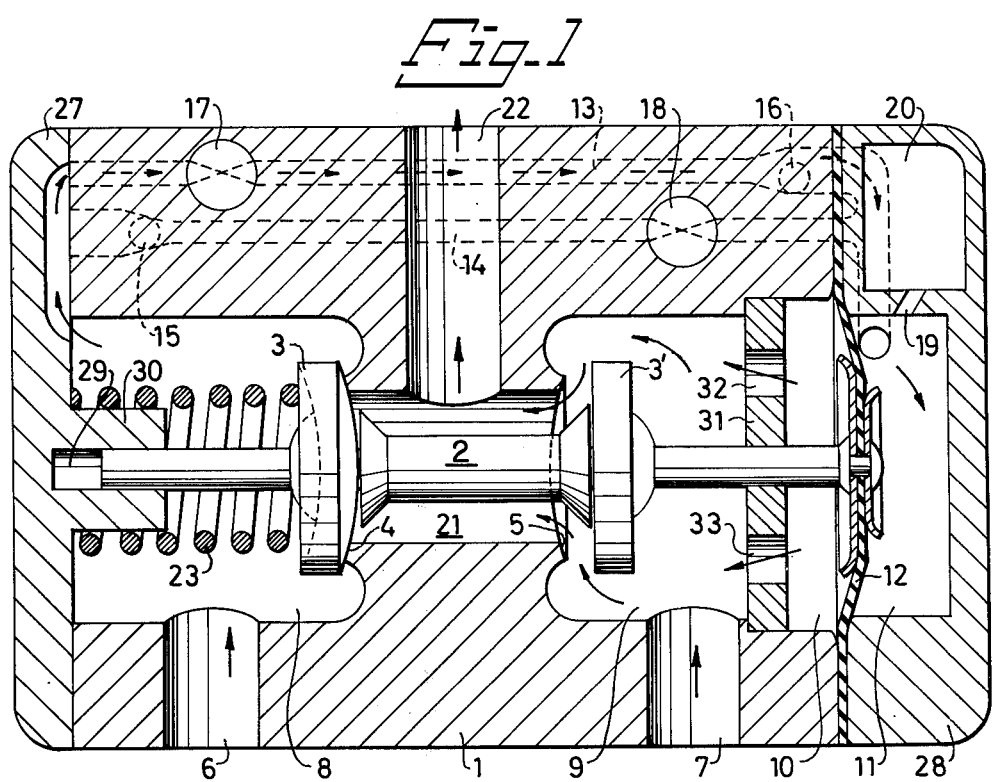

United States Patent
Rydberg

[11] 3,910,303
[45] Oct. 7, 1975

[54] VALVE

[76] Inventor: Sigge Rydberg, Kopparvagen 57, S-175 72 Jarfalla, Sweden

[22] Filed: June 7, 1974

[21] Appl. No.: 477,369

[30] Foreign Application Priority Data
June 8, 1973   Sweden .............................. 7308181
Sept. 25, 1973   Sweden .......................... 7313017

[52] U.S. Cl. ............................. 137/112; 137/624.14
[51] Int. Cl.² ....................................... F16K 31/365
[58] Field of Search ....................... 137/112, 624.14

[56] References Cited
UNITED STATES PATENTS
1,606,530   11/1926   Harris ................................ 137/112
3,614,965   10/1971   Metivier ..................... 137/624.14 X

*Primary Examiner*—Robert G. Nilson
*Attorney, Agent, or Firm*—Burns, Doane, Swecker & Mathis

[57] ABSTRACT

A valve mechanism comprising a spool supporting two valves which control flow between two inlets and an outlet. A diaphragm actuator is connected with the spool, with movement of the diaphragm actuator being controlled by fluid pressure in a control chamber. One fluid passage provides for flow from one chamber communicating with one inlet to the control chamber while another fluid passage provides for flow from the control chamber to this one chamber. Variable control valve means provide control over fluid flow through each of these fluid passages.

12 Claims, 5 Drawing Figures

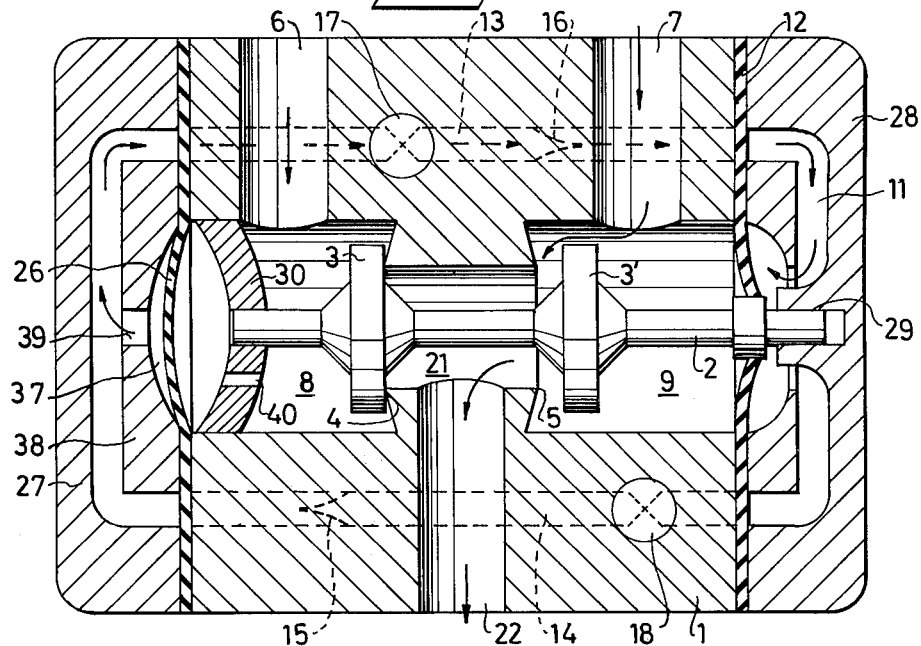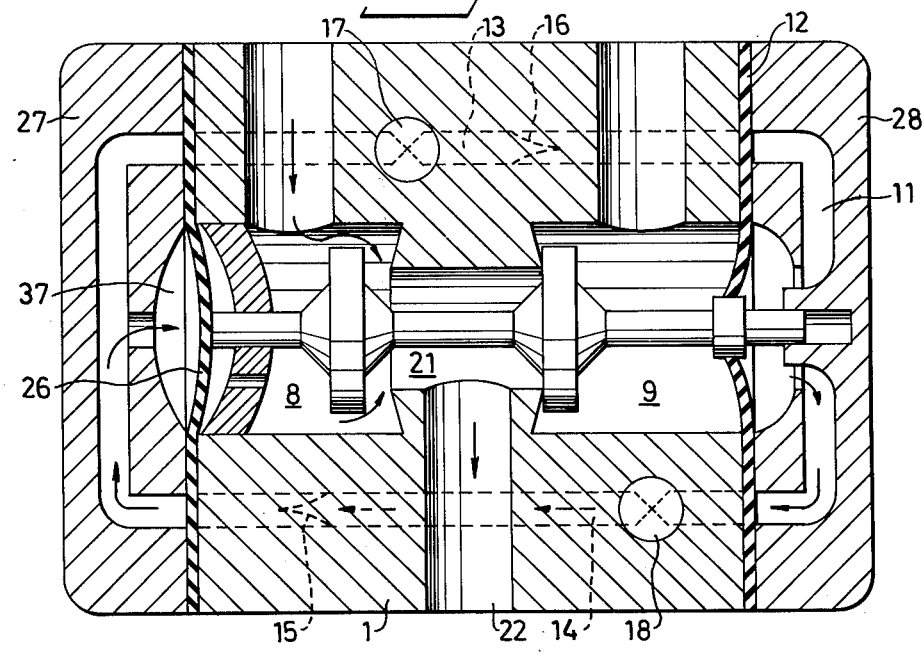

VALVE

The present invention relates to a valve comprising a housing having a first inlet for a first pressure medium and a second inlet for a second pressure medium, and being arranged to direct alternately the first and the second medium to a recipient at selected time intervals.

Valves of this type can be used, for example, for mixing liquids or gases, wherein cold water, for example, is directed to said recipient for a time period of specific duration, immediately whereafter hot water is directed to said recipient over a further specific period of time, the duration of which latter period is independent of that of the first period.

An object of the invention is to provide a relatively simple and reliable valve of the aforementioned type, with which the intervals at which the valve operates can be changed arbitrarily within wide limits.

Accordingly, the present invention consists in a valve, comprising a housing having a first inlet for a first pressure medium and a second inlet for a second pressure medium, said valve being arranged to direct said media alternately to a recipient at selected time intervals, wherein said valve further comprises a first chamber connected to the first inlet and a second chamber connected to said second inlet; an axially reciprocatingly movable valve spindle provided with the first valve body and arranged to sealingly abut in a first position of the valve spindle a first valve seat of a passage located between the first chamber and an outlet means and, in a second position of said valve spindle, to rest at a distance from the first valve seat; a second valve body arranged to rest, in said first position of said valve spindle, at a distance from a second valve seat of a passage located between the second chamber and the outlet means and, in said second position of said valve spindle, to sealingly abut the second valve seat; a flexible diaphragm arranged to communicate at one side surface thereof with the interior of the second chamber and mounted to the valve spindle and being reciprocatingly movable in the axial direction of said spindle, said diaphragm communicating at its other side surface with a control chamber which is arranged to communicate via a first through-flow passage having a variable control valve means and a second through-flow passage having a second variable control valve means, with the first chamber; wherein the first through-flow passage is provided with valve means which permit medium to flow from the first chamber to the control chamber; and wherein the second through-flow passage is provided with valve means to permit medium to flow from the control chamber to the first chamber.

Figure 2:
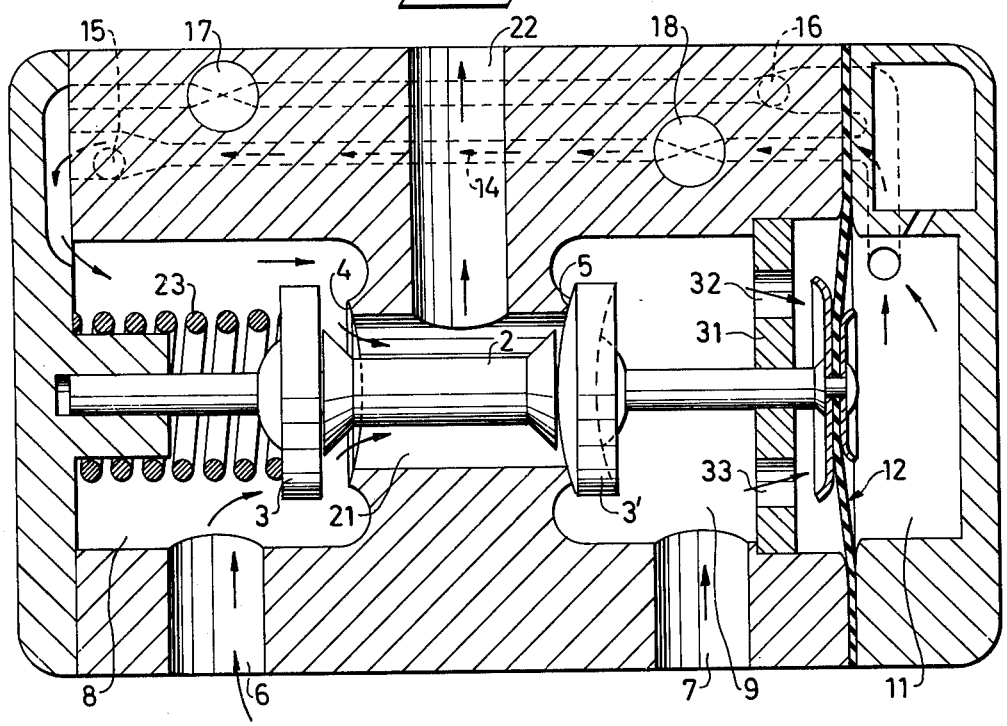
Figure 3:
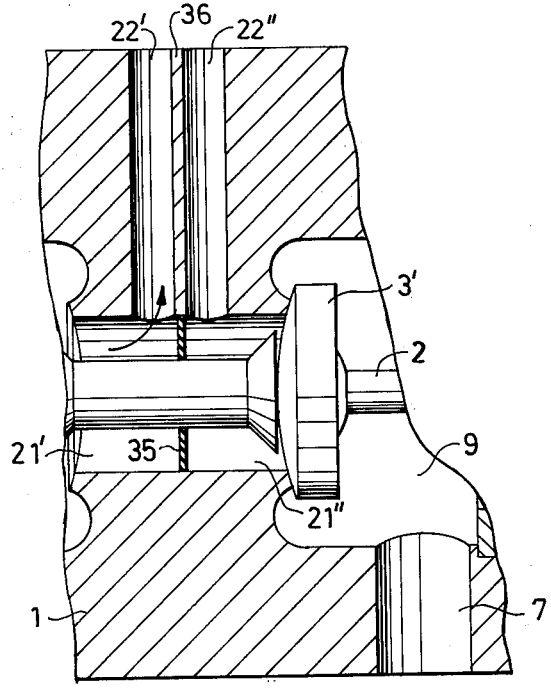

So that the invention shall be more readily understood and further features thereof made apparent, embodiments of the invention will now be described by way of example with reference to the accompanying drawing, in which FIG. 1 is an axial sectional view through the valve in a first working position of said valve, FIG. 2 shows a second working position of the valve, FIG. 3 shows a modified valve outlet, FIG. 4 is an axial sectional view through a modified valve in a first position of the valve spindle, and FIG. 5 shows the modified valve of FIG. 4 with the valve spindle in a second position.

FIGS. 1 and 2 show a valve housing 1 having outwardly open ends which are sealed by means of walls 27 and 28. Arranged in the interior of the housing is a chamber 8, to which is connected an inlet 6 for a gaseous or liquid medium. The chamber 8 is arranged to communicate with an outlet 22 via a passage 21. Located in the opening of the passage 21 facing the chamber 8 is a ring-shaped valve seat 4 arranged to co-act with a valve body 3 which, in the position shown in the FIG. 1, is arranged to sealingly abut the valve seat 4.

The housing 1 is provided with a second chamber 9 arranged to communicate with an inlet 7 for a gaseous or liquid medium. The chamber 9 communicates with the outlet 22 via a passage. Located in the opening of said passage facing the chamber 9 is a second ring-shaped valve seat 5 which is arranged to co-act with a valve body 3'. The two valve bodies 3 and 3' are arranged on a common, axially movable spindle 2, as hereinafter described. With the illustrated embodiment, the two chambers 8 and 9 coaxial with each other. When seen in the drawing, the right end of the spindle 2 is journaled in a bearing 31 having openings 32 and 33, and its left end is axially slidably mounted in a recess 29 in a bearing 30 on the inside of the wall 27. The right end of the spindle 2 is in liquid-tight connection with a flexible diaphragm 12 which, together with the wall 28, defines a control chamber 11. Opening out into the control chamber 11 is a first medium passage 13, in which there is arranged a first controllable restriction 17 and a non-return valve 16, the latter permitting medium to flow into the control chamber 11. The through-flow passage 13 is arranged to communicate with the first chamber 8.

The first chamber 8 is connected with the control chamber 11 by means of a second through-flow passage 14 in which there is arranged a selectably adjustable control valve 18 arranged to be set in dependence of the temperature of one medium, for example, a non-return valve 15. The valve 15 is arranged to permit medium to flow from the control chamber 11 to the first chamber 8. With the illustrated embodiment, there is provided a pressure spring 23 which, in the absence of pressure medium in the valve, holds the spindle in the position shown in FIG. 1, thereby to facilitate the initial movement of the spindle 2. The spring, however, may be omitted; in which case the valve may be inclined, for example, so that the spindle moves under its own weight to a starting position in which one of the valve bodies 3, 3' is in sealing abutment with its respective seat 4 or 5.

The aforedescribed valve operates in the following manner:

It is assumed that the spindle 2 occupies the position shown in FIG. 1 and that a pressure medium is supplied to the inlets 6 and 7. The inlet 6, for example, may be connected to a line conveying cold water under pressure, while the inlet 7 may be connected to a line conveying hot water under pressure. With the illustrated embodiment, there is provided a pressure equalizing chamber 20 which is connected with the control chamber 11 via an opening 19. The pressure equalizing chamber 20 contains a compressible medium, which medium may be air or rubber. The equalizing chamber is provided to create an additional force upon movement of the spindle to the left as seen in the FIGURE, said force counteracting the increase in pressure in the previously open chamber and to absorb force upon movement of said spindle to the right, and in both cases to cause a lesser degree of bulging of the diaphragm.

The equalizing chamber, however, is not an absolutely necessary feature of the invention and may be omitted if desired.

As will be understood, the hot water will flow through the inlet 7 past the valve body 3' and the valve seat 5 and through the passage 21 to the outlet 22, as indicated by the arrows in FIG. 1. Since the valve body 3 is in sealing abutment with the seat 4, the cold water will not reach the outlet 22. Cold water, however, will flow through the control valve 17 and the passage 13 and past the non-return valve 16 into the control chamber 11. After a determined time interval has lapsed, which interval is determined by a pressure drop in the control valve 17, the pressure in the control chamber 11 will approach the pressure in the chamber 8. The pressure in the chamber 9, through which the water flows freely, is then overcome by the pressure prevailing in the control chamber 11, and the flexible diaphragm 12 is moved to the left in FIG. 1, whereupon the valve body 3' will snap in, against the seat 5 to cut off the flow of medium. The valve spindle 2 of the valve bodies now occupies the position shown in FIG. 2, and cold water will thus flow through the inlet 6 and the passage 21 to the outlet 22.

The pressure in the chamber 9, which pressure corresponds with the hot water pressure, will now act on the diaphragm valve and water will flow from the control chamber 11 through the control valve 18 and the passage 14 into the chamber 8, the pressure in said chamber being relatively low owing to the substantially unhindered flow therethrough. After a certain period of time has lapsed, which period depends on the setting of the control valve 18, the pressure in the control chamber 11 will decrease, so that the diaphragm 12, and therewith the spindle 2 and valve bodies 3, 3', will move to the right to interrupt the connection between the chamber 8 and the outlet 2 and to open the connection between the chamber 9 and said outlet. The described sequence of events with a reciprocating movement of the valve spindle is then repeated until the supply of water to one or both inlets 6, 7 is stopped or the outlet is blocked.

The mutual relationship between the valve working intervals can be varied within very wide limits, by changing the setting of the respective control valves or restrictions 17 and 18.

FIG. 3 shows an embodiment with the valve 2 in the position shown in FIG. 2 and with a partition wall 36 arranged in the outlet, said wall dividing said outlet into two separate outlets 22' and 22''. The outlet 22' is connected to the first chamber 8 and the outlet 22'' to the second chamber 9, by reason of the fact that the wall 36 is in liquid-tight connection with a flexible diaphragm 35, which is sealingly connected to the spindle 2 and which divides the passage 21 in FIGS. 1 and 2 into two part-passages 21' and 21''. A valve of this design is particularly suitable when it is not desired to mix the two media or when mixing of said media shall be effected later.

FIGS. 4 and 5 show a modified embodiment of the valve, in which the control medium is completely separate from the medium flowing through the valve. Elements which are the same as those described with regard to the embodiments of FIGS. 1–3 are identified by the same references. Thus, FIGS. 4 and 5 show a valve housing 1 having two outwardly open ends which are sealed by means of walls 27, 28 respectively. Clamped between the walls 27 and the housing 1 is flexible partition, which may have the form of a diaphragm 26. The diaphragm 26, together with the wall 27, forms a control chamber 27 for a control medium, which may be in gas or liquid form. A central opening 39 located in the wall 27 opens into a passage 38. The central space of the housing 1 accomodates a pressure medium chamber 8 having an inlet 6 and communicating with an outlet 22 via a valve body 3 and a seat 4. The central cavity of the housing 1 also accomodates a pressure medium chamber 9 having an inlet 7 and communicating via a passage 21, with the outlet 22 via a valve body 3' and a seat 5. The two pressure medium chambers 8 and 9 may be of cylindrical configuration and are arranged coaxially with one another and are throughpassed by a valve spindle 2, on which the two valve bodies 3 and 3' are arranged. With the illustrated embodiment the right end of the spindle 2 is slidably mounted in a bearing 29 on the walls 28 and its left end is slidably mounted in a bearing 30 having a throughflow opening 40. A diaphragm 12, which is sealingly connected with the spindle 2, is arranged between the bearing 29 and the valve body 3'. The outer portion of the diaphragm 12 is secured and sealing arranged between the walls 28 and the housing 1. The walls 27, 28 are connected to the housing by means of bolts for example.

Arranged between the diaphragm 12 and the walls 28 is a first control chamber 11. The control chamber 11 is arranged to communicate with a second control chamber 37 through a first through-flow passage 13 and a second through-flow passage 14. The passage 13 has a first adjustable restrictor or control valve 17 and a valve means 16 which will only permit medium to flow from the control chamber 37 to the control chamber 11. The passage 14 is provided with a second adjustable restriction or control valve 18 and a valve means 15 which will only permit medium to flow from the control chamber 11 to the control chamber 37. Thus, the control chamber 11, 37 and the through-flow passages 13, 14 form a closed control system for the spindle 2, whereby a control medium which is completely separate from the pressure medium media supplied to the inlets can be used. The control valves and other valve components are thus not exposed to foreign matter which may be present in the inflowing media, to which they may be sensitive.

FIG. 4 illustrates the case where pressure media, for example cold water under pressure, flows in through the inlet 7 to the outlet 22 via the chamber 9 and the open valve 3', 5. The high pressure in the chamber 8 is transferred through the diaphragm 26 to the control chamber 37 and control medium will flow through the passage 13 to the control chamber 11. The valve spindle 2 is moved by the diaphragm 12 to the left, while the pressure in the control chamber 11 has reached a pre-determined value which exceeds the pressure in the chamber 9. In the new position of the spindle shown in the FIG. 5, owing to the high pressure prevailing in the chamber 9, control medium will begin to flow from the control chamber 11 into the control chamber 37 through the passage 14 and, after a time interval determined by the setting of the check valve 18, the pressure in the control chamber 11 will have decreased to a determined magnitude lying beneath the pressure prevailing in the chamber 9 sufficient to cause the diaphragm 12 to move the spindle 2 to the position shown in FIG.

4. The described sequence of events is then repeated.

The relative duration of the two time intervals is adjusted through the restrictions 17 and 18.

Although the invention has been described and illustrated with reference to embodiments thereof, these embodiments are not restrictive and the invention can be modified within the scope of the following claims. For example, the through-flow passages, which in the illustrated embodiment are arranged in the material of the housing 1, can be replaced with corresponding pipes arranged in or externally of the housing 1. With the illustrated embodiments, the valve bodies 3 and 3' are assumed to comprise flexible plates. The valve bodies, however, may be of any suitable form. Further, the partition diaphragm 35 may be omitted and the wall 36 extended downwardly to divide the passage 21. In this instance, the spindle 2 will pass sealingly through a hole in the wall 36. The embodiment comprising a divided outlet is also suitable for dividing in to part flows one and the same in-flow of pressure medium, i.e., the first pressure medium is identical to the second pressure medium in two outgoing, alternate flows of media.

I claim:

1. A valve comprising a housing having a first inlet for a first pressure medium and a second inlet for a second pressurre medium, said valve being arranged to direct said media alternately to a recipient at selected time intervals, characterized in that said valve further comprises a first chamber connected to the first inlet and a second chamber connected to said second inlet; an axially reciprocatingly movable valve spindle provided with a first valve body and arranged to sealingly abut in a first position of the valve spindle a first valve seat of a passage located between the first chamber and an outlet means and, in a second position of said valve spindle to rest at a distance from the first valve seat, a second valve body arranged to rest, in said first position of said valve spindle, at a distance from a second valve seat of a passage located between the second chamber and the outlet means and, in said second position of said valve spindle, to sealingly abut the second valve seat; a flexible diaphragm arranged to communicate at one side surface thereof with the interior of the second chamber and mounted to the valve spindle and being reciprocatingly movable in the axial direction of said spindle, said diaphragm communicating at its other side surface with a control chamber which is arranged to communicate via a first through-flow passage having a variable control valve means and a second through-flow passage having a second variable control valve means, with the first chamber and in that the first through-flow passage is provided with valve means which permit medium to flow from the first chamber to the control chamber and in that the second through-flow passage is provided with valve means to permit medium to flow from the control chamber to the first chamber.

2. A valve according to claim 1, wherein the first chamber is coaxial with the second chamber and wherein the valve spindle is arranged for reciprocating movement in the two chambers.

3. A valve according to claim 2, wherein the outlet means is arranged in the housing between the two valve seats.

4. A valve according to claim 3, wherein the outlet means and the passage are divided by means of a partition to form two separate outlets.

5. A valve according to claim 4, wherein the portion of the partition surrounding the valve spindle comprises a flexible diaphragm which is sealingly connected to the valve spindle.

6. A valve according to any of claims 1, wherein the control chamber contains a compressible medium.

7. A valve according to claim 6, wherein the compressible medium is accommodated in a pressure equalizing chamber arranged to communicate with the control chamber.

8. A valve according to claim 6, wherein the pressure equalizing chamber contains an elastomeric material.

9. A valve according to claim 6, wherein the equalizing chamber is arranged on a higher level than the control chamber and contains a gas.

10. A valve according to any of claims 1, wherein the first chamber is divided by means of a flexible diaphragm into two mutually separated part chambers of which one communicates with the first inlet and the other communicates via said through-flow passages, with the control chamber to form a closed control system for controlling the valve spindle.

11. A valve according to claim 1, wherein the closed control system contains a gas.

12. A valve according to claim 1, wherein the closed control system contains a liquid.

* * * * *